US010528223B2

(12) United States Patent
Strong et al.

(10) Patent No.: US 10,528,223 B2
(45) Date of Patent: Jan. 7, 2020

(54) PHOTO NARRATIVE ESSAY APPLICATION

(71) Applicant: SmugMug, Inc., Mountain View, CA (US)

(72) Inventors: Brian Strong, San Jose, CA (US); Craig Andrew Murray, San Jose, CA (US)

(73) Assignee: SMUGMUG, INC., Mountain View, CA (US)

( * ) Notice: Subject to any disclaimer, the term of this patent is extended or adjusted under 35 U.S.C. 154(b) by 328 days.

(21) Appl. No.: 14/964,291

(22) Filed: Dec. 9, 2015

(65) Prior Publication Data
US 2016/0179760 A1 Jun. 23, 2016

Related U.S. Application Data

(60) Provisional application No. 62/094,796, filed on Dec. 19, 2014.

(51) Int. Cl.
G06F 3/0482 (2013.01)
H04N 21/8405 (2011.01)
H04N 21/00 (2011.01)
H04N 21/81 (2011.01)

(52) U.S. Cl.
CPC .......... G06F 3/0482 (2013.01); H04N 21/00 (2013.01); H04N 21/8153 (2013.01); H04N 21/8405 (2013.01)

(58) Field of Classification Search
CPC .............................. G06F 17/212; G06F 3/0482
See application file for complete search history.

(56) References Cited

U.S. PATENT DOCUMENTS

| 8,793,573 B2 * | 7/2014 | Beckmann | G06F 16/958 715/251 |
| 2002/0087601 A1 | 7/2002 | Anderson et al. | |
| 2006/0004698 A1 * | 1/2006 | Pyhalammi | G06F 16/44 |
| 2006/0242126 A1 * | 10/2006 | Fitzhugh | G06F 16/44 |
| 2006/0253783 A1 * | 11/2006 | Vronay | G06F 17/248 715/730 |
| 2007/0300158 A1 * | 12/2007 | Kasperkiewicz | G06F 16/40 715/731 |
| 2008/0304808 A1 | 12/2008 | Newell et al. | |
| 2009/0119614 A1 * | 5/2009 | Tienvieri | G06F 16/532 715/786 |
| 2009/0158214 A1 * | 6/2009 | Arnold | G06F 16/44 715/830 |
| 2009/0160731 A1 * | 6/2009 | Schuler | G06F 3/1423 345/1.1 |
| 2009/0305743 A1 * | 12/2009 | Gouesbet | H04N 1/3877 455/566 |
| 2009/0319472 A1 * | 12/2009 | Jain | G11B 27/105 |

(Continued)

Primary Examiner — Anil K Bhargava
(74) Attorney, Agent, or Firm — Patterson + Sheridan, LLP

(57) ABSTRACT

Embodiments described herein generally relate to a photo narrative display application. The photo narrative essay application may organize and display media items in a logical, aesthetically pleasing, narrative layout with minimal input from a user. By automatically analyzing the metadata variables of the media items to be displayed, the photo narrative essay application automatically organizes and displays the media items in a logical, narrative, aesthetically pleasing manner, regardless of the device the photo narrative essay is being displayed on.

21 Claims, 10 Drawing Sheets

(56) References Cited

U.S. PATENT DOCUMENTS

| | | | |
|---|---|---|---|
| 2011/0234613 A1* | 9/2011 | Hanson | G06F 16/58 345/589 |
| 2011/0276396 A1* | 11/2011 | Rathod | G06Q 10/00 705/14.49 |
| 2014/0172856 A1* | 6/2014 | Imbruce | G06F 17/212 707/737 |
| 2014/0195973 A1* | 7/2014 | Won | H04M 1/72583 715/823 |
| 2014/0245133 A1* | 8/2014 | McCoy | G06F 17/212 715/236 |
| 2014/0282099 A1* | 9/2014 | Bronder | H04L 67/2838 715/753 |
| 2014/0337324 A1* | 11/2014 | Chao | G06F 3/04817 707/722 |
| 2015/0234805 A1 | 8/2015 | Caswell | |
| 2015/0268825 A1* | 9/2015 | Frey | G06F 3/04845 715/763 |
| 2015/0370888 A1 | 12/2015 | Fonseca E Costa et al. | |
| 2016/0132231 A1* | 5/2016 | Rathod | H04N 5/23216 715/719 |
| 2016/0139761 A1* | 5/2016 | Grosz | G06F 3/1243 715/769 |

* cited by examiner

PHOTO NARRATIVE ESSAY APPLICATION

CROSS-REFERENCE TO RELATED APPLICATIONS

This application claims benefit to U.S. Provisional Patent Application No. 62/094,796, filed Dec. 19, 2014, the entirety of which is herein incorporated by reference.

BACKGROUND

Field

Embodiments described herein generally relate to a method of displaying content on a website. More specifically, embodiments provided herein relate to a photo narrative essay application.

Description of the Related Art

The Internet has gained prevalence in today's society enjoyed by few other technologies. The backbone of the Internet is the almost countless number of websites that can be accessed by users around the world. Many websites present media galleries, such as photo galleries, allowing anyone who has access to the website to view the media gallery. This allows people to easily share their personal information, news, photos, videos and many other types of media in a gallery through a website. The evolution of media galleries has resulted in a demand from viewers that the galleries are logically organized and are aesthetically pleasing.

A user may upload hundreds or thousands of media items at a time, which may all then be presented in a single gallery. The media items may be uploaded haphazardly, without any discernible organizational strategy, which results in the gallery being displayed in a chaotic and disorganized manner. Organizing all the media items in the gallery can require a lot of effort and time, especially if the user desires that the gallery is displayed in a manner representative of the user's experience with the media items. A user may rearrange the media items or add new media items to the gallery so that the gallery is aesthetically pleasing. The user must then make design changes once again to the gallery to accommodate the new media items before the gallery is acceptable for viewing. Each time the user desires to upload new media items to the gallery or to rearrange the media items already present in the gallery, the same process must be performed, thus, increasing the difficulty of maintaining a gallery.

Moreover, when a website is viewed on different browsers and various devices, such as desktop computers or mobile phones, the display of the gallery may not be acceptable for each browser or device. Thus, the aesthetic qualities of the gallery may be reduced.

Therefore, what is needed in the art is an application for automatically organizing and displaying media items in a logical, narrative, and aesthetically pleasing way in a gallery with minimal input or effort.

SUMMARY

Embodiments described herein generally relate to a photo narrative display application. The photo narrative essay application may organize and display media items in a logical, aesthetically pleasing, narrative layout with minimal input from a user. By automatically analyzing the metadata variables of the media items to be displayed, the photo narrative essay application automatically organizes and displays the media items in a logical, narrative, aesthetically pleasing manner, regardless of the device the photo narrative essay is being displayed on.

In one embodiment, a method of displaying media items is provided. The method may comprise receiving one or more media items, receiving a first input regarding a first display feature, and analyzing metadata variables of the one or more media items. The one or more media items may be organized into one or more clusters in the first display feature in response to the analyzed metadata variables and the first media input. The one or more clusters may be visually distinct from one another in the first display feature. The one or more clusters may be displayed and the one or more media items within each cluster may be further organized and displayed in response to a predetermined priority allocation between the metadata variables.

In another embodiment, a computer readable storage medium may be provided. The computer readable storage medium may store instructions that when executed by a processor, cause the processor to display media items by performing the steps of receiving one or more media items, receiving a first input regarding a first display feature, and analyzing metadata variables of the one or more media items. The one or more media items may be organized into one or more clusters in the first display feature in response to the analyzed metadata variables and the first media input. The one or more clusters may be visually distinct from one another in the first display feature. The one or more clusters may be displayed and the one or more media items within each cluster may be further organized and displayed in response to a predetermined priority allocation between the metadata variables.

In yet another embodiment, a computer system for displaying media items may be provided. The computer system may comprise a processor and a memory. The memory may store instructions that, when executed by the processor, cause the computer system to receive one or more media items, receive a first input regarding a first display, and analyze metadata variables of the one or more media items. The one or more media items may be organized into one or more clusters in the first display feature in response to the analyzed metadata variables and the first media input. The one or more clusters may be visually distinct from one another in the first display feature. The one or more clusters may be displayed and the one or more media items within each cluster may be further organized and displayed in response to a predetermined priority allocation between the metadata variables.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized in other embodiments without specific recitation.

DETAILED DESCRIPTION

Embodiments described herein generally relate to a photo narrative display application. The photo narrative essay application may organize and display media items in a logical, aesthetically pleasing, narrative layout with minimal input from a user. By automatically analyzing the metadata variables of the media items to be displayed, the photo narrative essay application automatically organizes and displays the media items in a logical, narrative, aesthetically pleasing manner, regardless of the device the photo narrative essay is being displayed on.

The term "user" as used herein includes, for example, a person or entity that owns a computing device or a wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "metadata" as used herein includes, for example, technical characteristics, such as aspect ratio, image type, camera type, lens type, pixels per photo, resolution, display pixel density, shutter speed, f stop, iso, color balance, manufacturer data; event/transactional characteristics, such as digital watermarking and non-destructive editing data; derived characteristics, such as metadata derived by interpreting existing metadata or calculating new metadata; descriptive/classification characteristics, such captions, keywords, geographical location, image categories, etc; automation characteristics, segmentation characteristics; security characteristics; discovery characteristics; history characteristics; business characteristics; and process characteristics. Metadata may be embedded in content or similarly attached to content. It is contemplated that the term "metadata" is not intended to be limiting and may include various examples beyond those described.

The term "media" or "media item" as used herein includes, for example, messages, photos, videos, audio, blogs, advertisements, geotags, notifications, and various other types of media which may be consumed by a user. The term "experience" as used herein may include media or media items associated with a geographical location. It is contemplated that the terms "media," "media item," or "experience" are not intended to be limiting and may include various examples beyond those described.

Figure 1:
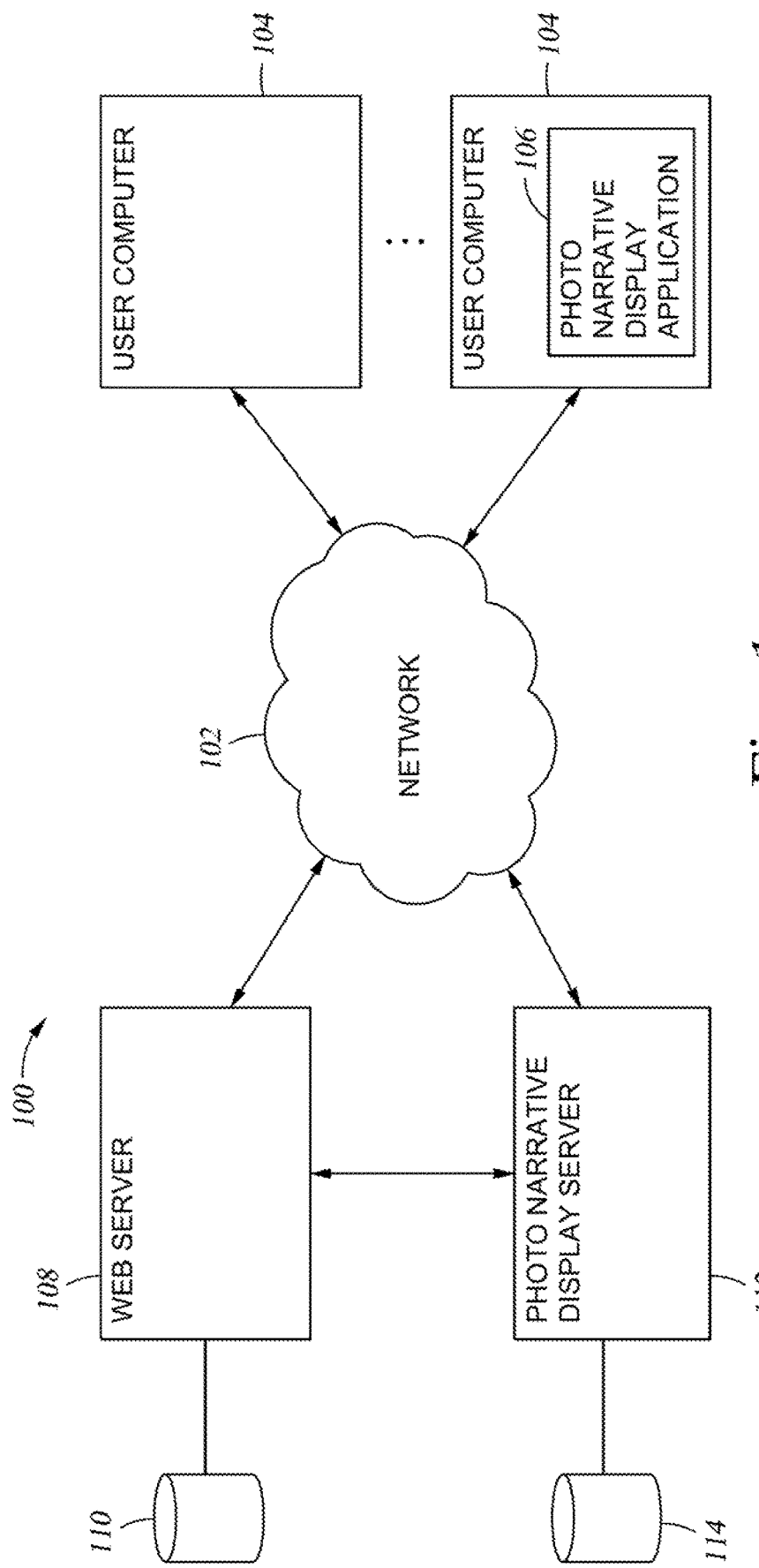
FIG. 1 schematically illustrates a computer system configured for providing a website having a photo narrative display application.

FIG. 1 illustrates a computer system configured for providing a photo narrative essay display. As shown, the computing system 100 may include a web server 108, a photo narrative display server 112, and a plurality of user computers 104 (only two of which are shown for clarity), each connected to a communications network 102 (e.g. the Internet). For example, the web server 108 may be programmed to communicate with the user computers 104 and the photo narrative display server 112 using a networking protocol such as TCP/IP protocol. The photo narrative display server 112 may communicate directly with the user computers 104 through the communications network 102.

Each user computer 104 may include conventional components of a computing device, e.g., a processor, system memory, a hard disk drive, input devices such as a mouse and a keyboard, and/or output devices such as a monitor, and/or a combination input/output device such as a touchscreen which not only receives input but also displays an output. The web server 108 and the photo narrative display server 112 may include a processor and a system memory (not shown), and may be configured to manage web pages and other media content stored in its respective content storage unit 110 and 114 using a file system and/or relational database software. The photo narrative display server 112 may be a web server configured to manage content metadata and heuristic characteristics stored in its respective content storage unit 114. The photo narrative display server 112 may be configured to receive input from a user, such as rearranging content or adding content to user's website and automatically scale and arrange the content within the website in an efficient and aesthetically pleasing manner.

In the embodiments described below, users are respectively operating the user computers 104 that may communicate over the network 102 to request webpages and other media content data from the photo narrative display server 112. Each user computer 104 may be configured to execute a software application, such as a photo narrative display application 106, and access webpages and/or media content data managed by the photo narrative display server 112 by specifying a uniform resource locator (URL) for the photo narrative display server 112 into the photo narrative display application 106. The webpages that are displayed to a user may be transmitted from the photo narrative display server 112 to the user's computer 104 and processed by the photo narrative display application 106 for display through a GUI of the user's computer 104.

It is noted that the user computer 104 may be a personal computer, laptop, mobile computing device, smart phone, video game console, home digital media player, network-connected television, set top box, and/or other computing devices having components suitable for communicating with the communications network 102. The user computer 104 may also execute other software applications configured to receive media content from the photo narrative display server 112, such as, but not limited to, metadata, heuristics, media display software, media players, computer and video games, and/or widget platforms.

Figure 2:
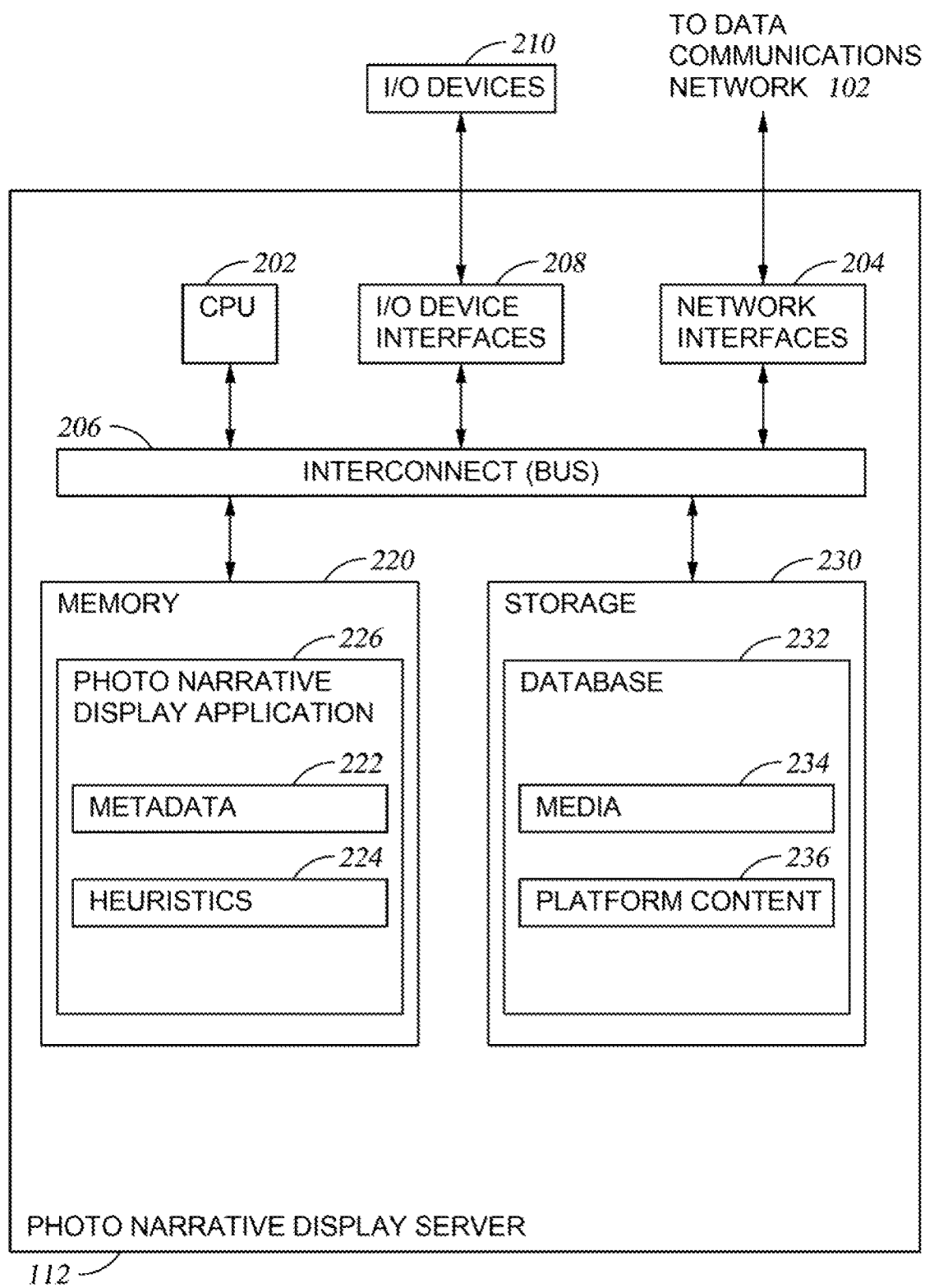
FIG. 2 schematically illustrates a more detailed view of a server of FIG. 1.

FIG. 2 illustrates a more detailed view of the photo narrative display server 112 of FIG. 1. The photo narrative display server 112 includes, without limitation, a central processing unit (CPU) 202, a network interface 204, memory 220, and storage 230 communicating via an interconnect bus 206. The photo narrative display server 112 may also include I/O device interfaces 208 connecting I/O devices 210 (e.g., keyboard, video, mouse, audio, touchscreen, etc). The photo narrative display server 112 may further include a network interface 204 configured to transmit data via the communications network 102.

The CPU 202 retrieves and executes programming instruction stored in the memory 220 and generally controls and coordinates operations of other system components. Similarly, the CPU 202 stores and retrieves application data residing in the memory 220. The CPU 202 is included to be representative of a single CPU, multiple CPU's, a single CPU having multiple processing cores, and the like. The interconnect 206 is used to transmit programming instructions and application data between the CPU 202, I/O device interfaces 208, storage 230, network interface 204, and memory 220.

The memory 220 is generally included to be representative of a random access memory and, in operation, stores software applications and data for use by the CPU 202. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), or a storage area-network (SAN) configured to store non-volatile data.

The memory 220 may store instructions and logic for executing a photo narrative display application 226. The photo narrative display application 226 may include analytic information, such as metadata 222 and heuristics 224, among other applications. The storage 230 may store website building content and help instructions and may include a database 232 configured to store data for displaying a website with associated instructions according to techniques described herein, such as media content 234 and platform content 236. The database 232 may also store data relating to display characteristics for providing the user with an essay that displays content in an efficient and aesthetically pleasing manner. The database 232 may be any type of storage device.

Figure 3:
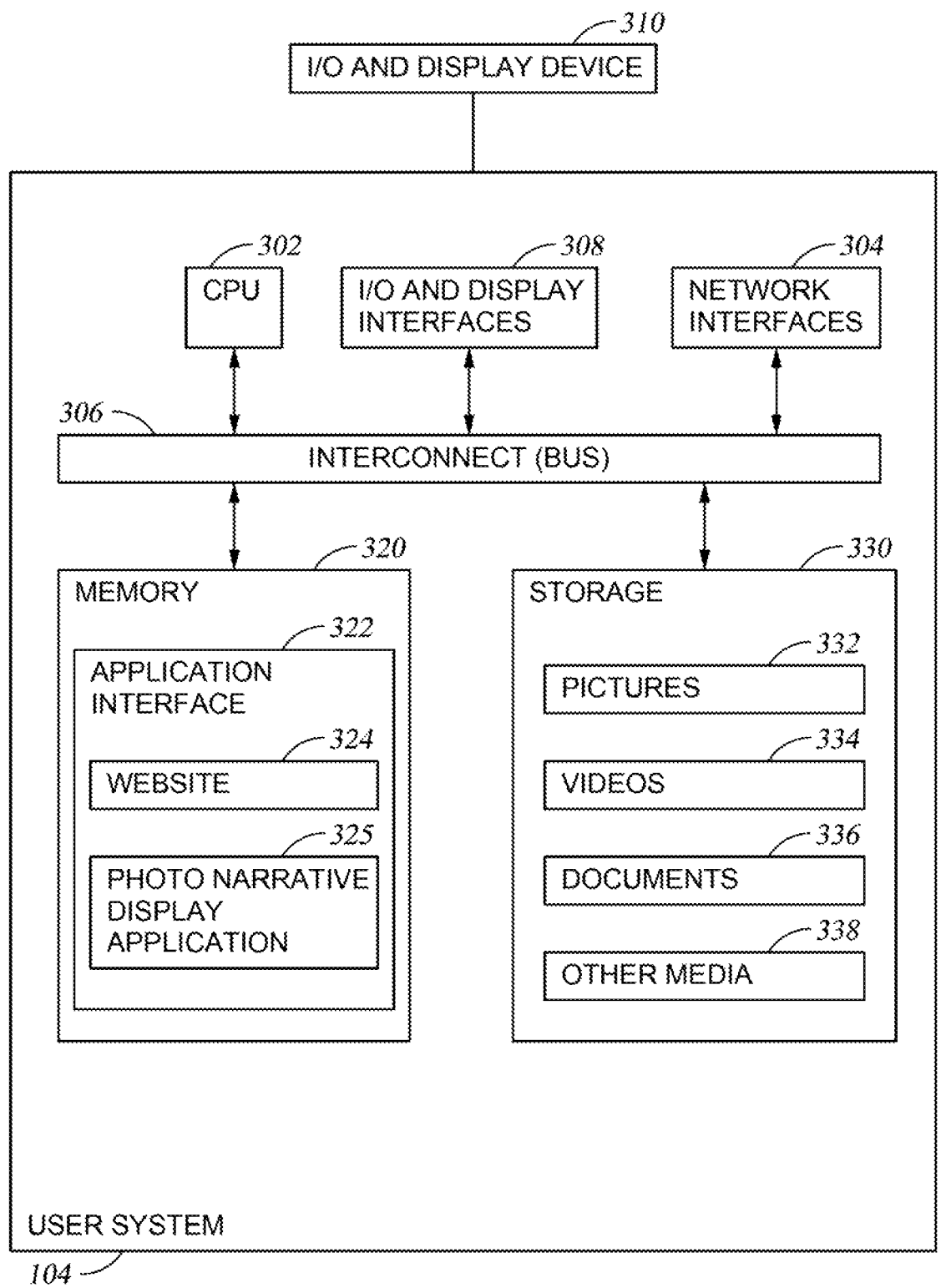
FIG. 3 schematically illustrates a user computing system used to access a website and utilize a photo narrative display application.

FIG. 3 illustrates a user computing system used to access the photo narrative display application server within a website, such as the users own website. The user computing system 104 may include, without limitation, a central processing unit (CPU) 302, a network interface 304, an interconnect 306, a memory 320, and storage 330. The computing system 104 may also include an I/O device interface 308 connecting I/O devices 310 (e.g. keyboard, display, touchscreen, and mouse devices) to the computing system 104.

Like CPU 202, CPU 302 is included to be representative of a single CPU, multiple CPU's, a single CPU having multiple processing cores, etc., and the memory 320 is generally included to be representative of a random access memory. The interconnect 306 may be used to transmit programming instructions and application data between the CPU 302, I/O device interfaces 308, storage 330, network interface 304, and memory 320. The network interface 304 may be configured to transmit data via the communications network 102, e.g. to stream content from the photo narrative display server 112, as well as to receive and present the user's website or photo narrative essay. Storage 330, such as a hard disk drive or solid-state storage drive (SSD), may store non-volatile data. The storage 330 may contain pictures 332, videos 334, documents 336, and other media 338 which can be any type of media that may be published to a website. Illustratively, the memory 320 may include an application interface 322, which itself displays a website 324 with media arranged by a photo narrative display application 325. The application interface 322 may provide a software application which allows the user to access web pages and other content hosted by the photo narrative display server 112. The application interface 322 may also allow any user of the user computer system 104 to access any website available on the Internet.

Figure 4:
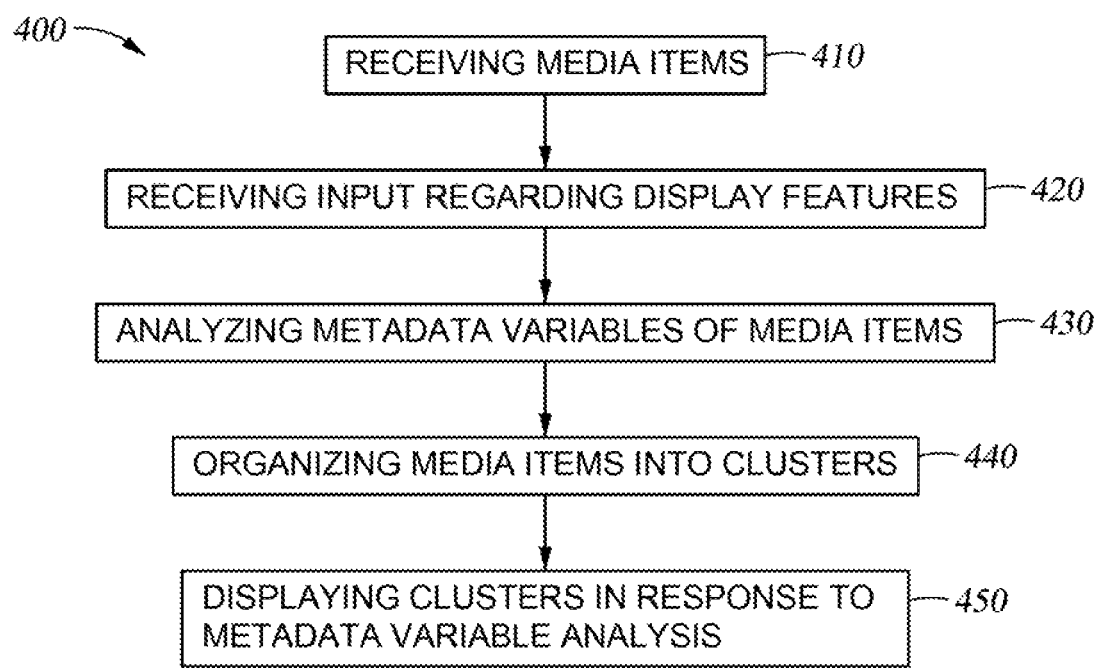
FIG. 4 is a schematic flow chart illustrating a method of displaying media items using a photo narrative essay application.

FIG. 4 is a schematic flow chart 400 depicting a method of displaying media items in a photo narrative essay. At operation 410, the photo narrative essay application may receive one or more media items. In one embodiment, the media items are photos and/or videos uploaded by a user. At operation 420, input regarding display features is received. A first input regarding a first display feature and a second input regarding a second input feature may both be received at operation 420. The first input and the second input may be a selection of media items a user has chosen to include in a photo narrative essay.

At operation 430, the metadata variables of the media items are analyzed. Analyzing the metadata variables may be performed automatically upon receipt of the one or more media items and the input regarding the display features. The metadata variables being analyzed at operation 430 may include a date variable, a time variable, a location variable, a format variable, and a caption variable, among others.

At operation 440, the media items are organized into clusters. The media items are organized into clusters in the display features in response to the analyzed metadata variables and the input regarding the display features. The media items may be organized into clusters automatically. The media items comprising each cluster may be related to one another. Additionally, the clusters may be organized relative to one another in the display features. Each cluster may comprise between about 1 media item and about 30 media items, for example, less than about 15 media items.

At operation 450, the clusters are organized in response to the metadata variable analysis. The media items within each cluster are organized and displayed in response to a predetermined priority allocation between the metadata variables. The media items within the clusters may be organized automatically. The clusters may be displayed in the second display feature in a logical, aesthetically pleasing, narrative way. The first display feature and the second display feature together may comprise the photo narrative essay in one embodiment. In another embodiment, the second display feature may comprise the photo narrative essay.

While the following embodiments utilize photos as examples of media items, the media items are not limited to photos. It is to be understood that the media items may be messages, photos, videos, audio, blogs, advertisements, geotags, notifications, and various other types of media which may be consumed by a user, as stated above.

Figure 5A:
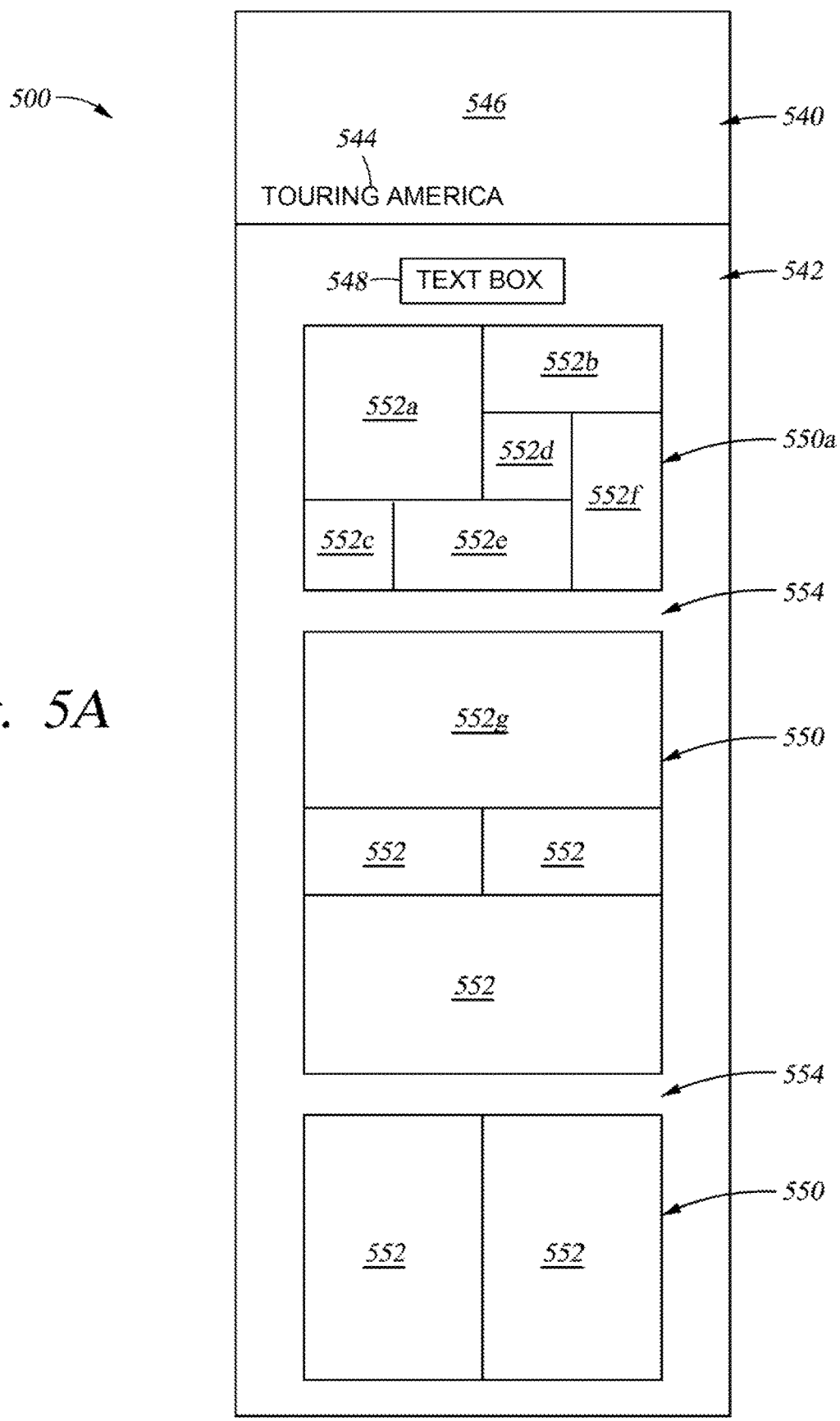
FIGS. 5A-5B illustrate examples of photo narrative essays displayed on various devices.

FIG. 5A illustrates one embodiment of a photo narrative essay 500 displayed on a graphic user interface, such as a desktop computer. The photo narrative essay 500 includes a first display feature 540 and a second display feature 542. The first display feature 540 may be a cover feature selected to be representative of the photo narrative essay 500. The first display feature 540, or cover, may include a title 544, a feature image 546, and a map. The second display feature 542 may display one or more clusters 550 and one or more key words 548. Each of the clusters 550 is a cluster or grouping of one or more media items 552 which are related to one another in some way. For example, the media items 552 displayed together in a single cluster 550 may have one or more metadata variables in common. Each cluster 550 is visually distinct from the other clusters 550 in the photo narrative essay 500. The clusters 550 may be separated by a divider 554, or gap. The divider 554 may be a region displayed on the graphic user interface which is substantially free of content. In one embodiment, the divider 554 is configured to visually separate adjacent clusters 550.

The one or more media items 552 within each cluster 550 are arranged in a nonrandom, orderly, and aesthetically pleasing manner in response to a heuristic analysis of the metadata variables of each of the media items 552. The one or more media items 552 may be arranged in a narrative fashion within each cluster 550. For example, the media items 552 within a single cluster 550 may be arranged and displayed such that a viewer of the cluster 550 is able to comprehend and understand the relationship between the media items 552 in the cluster 550. Further, each of the clusters 550 may be arranged in a narrative fashion relative to one another. Similar to the arrangement of the media items 552 within the clusters 550, the arrangement of individual clusters 550 may also be arranged and displayed such that a viewer of the photo narrative essay 500 is able to comprehend and understand the relationship between the clusters 550 within the photo narrative essay 500. The dividers 554 between the clusters 550 may define the narrative of the media items 552 such that the photo narrative essay 500 is aesthetically pleasing and logically organized. The feature image 546 from the first display feature 540 may also be included in a cluster 550 in the second display feature 542. In one embodiment, the feature image 546 may be selected to be representative of the subject matter of the photo narrative essay 500.

Figure 5B:
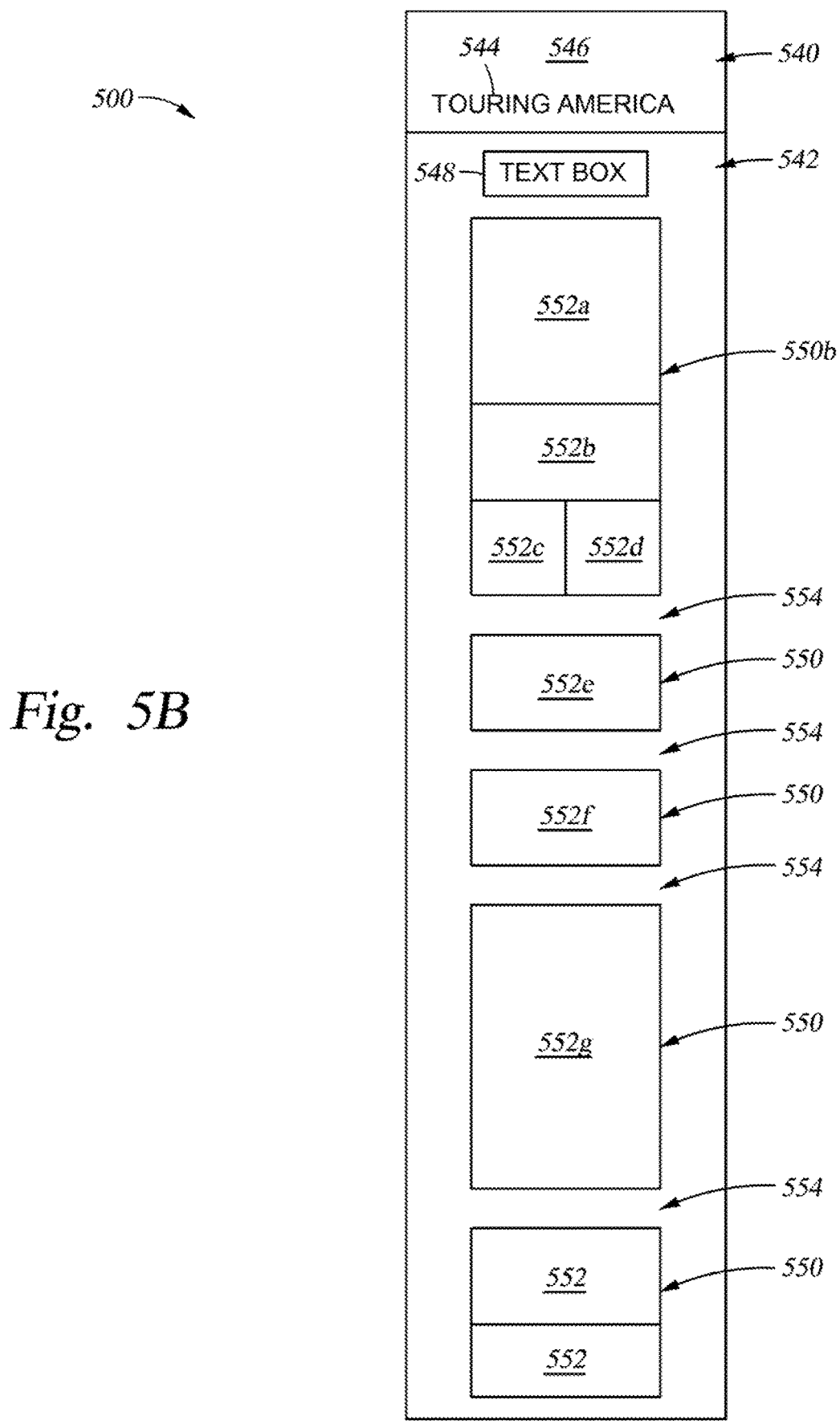

FIG. 5B illustrates the photo narrative essay 500 viewed on a mobile graphic user interface, such as a tablet, cell phone, or the like. As shown in FIG. 5B, the clusters 550 and the media items 552 may be arranged differently when viewed on the mobile graphic user interface than when viewed on the graphic user interface of FIG. 5A. For example, a first cluster 550a in FIG. 5A includes media items 552a-552f. A first cluster 550b of FIG. 5B includes media items 552a-552d. Media items 552e and 552f comprise their own clusters. In FIG. 5B, media items 552a-552f are arranged in a different order, orientation, and cluster configuration than in FIG. 5A, which provides for an aesthetically enhanced viewing experience on the mobile graphic user interface. Some of the media items 552, such as media item 552f, may be rotated to ensure the best viewing experience. For example, media item 552f is displayed in the first cluster 550a in FIG. 5A in a portrait orientation and the media item 552f is displayed in cluster 550b in the photo narrative essay 500 in FIG. 5B in a landscape orientation. The photo narrative display application 325 automatically adapts the photo narrative essay 500 to the display parameters of the graphic user interface, without the input of a user or viewer.

In operation, a user may upload media items 552, such as photos in a gallery, to the photo narrative display server 112. The user may then select any number of media items 552 to be included in the photo narrative essay 500. Alternatively, the user may upload media items 552 directly to the photo narrative display application 325. The user may select one media item 552 for the first display feature 540 and any number of media items 552 to be included in the second display feature 542. The media item 552 selected for the first display feature 540 may be the feature image 546.

Metadata variables of the one or more media items 552 chosen by the user for the second display feature 542 are then automatically analyzed by the photo narrative display application 325. The metadata variables analyzed may include a date variable, a time variable, a location variable, a format variable, and a caption variable of the media items 552, among others. Additionally, after a user creates a photo narrative essay 500, the user may then add or remove additional media items 552 to and from the photo narrative essay 500. After the addition or removal of additional media items, the photo narrative display application 325 may reanalyze the metadata of the media items 552 selected for the photo narrative essay 500, and re-determine the organization of the media items 552 and the clusters 550. As a result, the photo narrative essay 500 may be redesigned automatically in response to additional input from the user.

The analysis of the metadata variables determines how the media items 552 and clusters 550 are organized and displayed in the photo narrative essay 500. In one embodiment, the analysis of the metadata variables determines how the clusters 550 are organized relative to one another. For example, clusters 550 may be ordered sequentially in response to a time metadata variable and visually separated by the divider 554 to logically represent breaks in time between the media items 552 displayed in each of the clusters 550. The metadata variable analysis also determines relationships or common attributes of the media items 552 to organize the media items 552 within a single cluster 550.

The number of media items 552 within each cluster 550 may be established by the analysis of metadata variables of the media items 552 provided by the user. The analysis of the metadata variables may determine which media items 552 are selected for a particular cluster 550 in response to when and where the media items 552 originated. For example, the media items 552 are photos, and all of the photos in one cluster may have been taken within a time period of one hour. All of the photos in another cluster may have been taken within a two mile radius of one another. In one embodiment, each cluster 550 comprises between about 1 photo and about 30 media items, such as less than about 15 media items.

Determining the organization and layout of media items 552 displayed in the clusters 550 generally varies in response to the number of media items 552 selected to be included in the photo narrative essay 500. For example, if the user chooses a large number of photos to be included, such as 300 photos, each cluster within the photo narrative essay may have a relatively larger number of photos comprising the clusters. If the user selects 300 photos to be included in the photo narrative essay, the photo narrative essay may be comprised of 20 clusters, each cluster including 15 photos. If a cluster contains a large number of photos, such as clusters containing 10-20 photos, each photo in the cluster may be presented in a relatively smaller size, such as the photo 552d or 552e in FIGS. 5A-5B, which are relatively small in comparison to photo 552g. A larger cluster may have a relatively smaller time constraint, such as 30 minutes, or a relatively smaller distance constraint, such as a half mile radius, which would be determined in response to the analysis of the metadata variables. The photo narrative display application 325 may analyze the 300 photos and determine the most logical and aesthetically pleasing manner of organization is to divide the photos into 15 to 25 clusters, each cluster containing 10 to 20 photos. If the user captured the 300 photos in a time period of about 5 hours and within about a 10 mile radius, the metadata analysis may determine to apply a time constraint of about 15 minutes when clustering the photos, or a distance constraint of about a half mile radius.

Alternatively, if a user chooses a small number of photos to be included, such as 30 photos, each cluster may include fewer photos, such as clusters containing 2-8 photos. If a cluster contains only a few photos, each photo may be presented in a relatively larger size, such as photo 552g in FIGS. 5A-5B, which is relatively large in comparison with photo 552b or photo 552e. A relatively small cluster might have a larger time constraint, such as one week, or a larger distance constraint, such as a 100 mile radius, which would be determined in response to the analysis of the metadata variables. The photo narrative display application 325 may analyze the 30 photos and determine the most logical and aesthetically pleasing manner of organization is to divide the photos into 5-15 clusters, each cluster containing 1-5 photos. If the user captured the 30 photos in a time period of about 5 hours and within about a 10 mile radius, the metadata analysis may determine to apply a time constraint of about one hour when clustering the photos, or a distance constraint of about a 2 miles radius.

The layout of the media items 552 within each cluster 550 is determined based on the metadata variable analysis. The media items 552 within a cluster 550 may be presented sequentially, whether the media item has a caption or not, by varying the scale, or by malleability, such that the arrangement of the media items is flexible to ensure the most aesthetically pleasing arrangement is displayed. For example, if a user provided a caption for a photo, that particular photo may be presented larger than the other photos within the cluster. In this embodiment, the photo narrative essay application 325 determines, based on a heuristic analysis of the metadata associated with the photo (i.e., the caption), that a captioned photo should be displayed more prominently than uncaptioned photos. Further, a cluster may be comprised of only photos which were captioned by the user.

If the user fails to select a media item 552 as the feature image 546, a captioned media item 552 from the second display feature 542 may be automatically selected. In another embodiment, the user may not choose to include a feature image 546. Media items 552 within a cluster 550 may also have similar key words associated with each media item 552. For example, the photo narrative essay application 325 may analyze associated keywords and group media items with similar keywords together in a single cluster 550. The media items 552 within each cluster 550 may vary in size as well, with some media items 552 presented in a larger size relative to other media items 552 included in the cluster 550, as shown in FIGS. 5A-5B. The media items 552 are automatically arranged in each cluster 550 such that the media items 552 are organized and displayed in a logical and aesthetically pleasing manner.

Figure 6A:
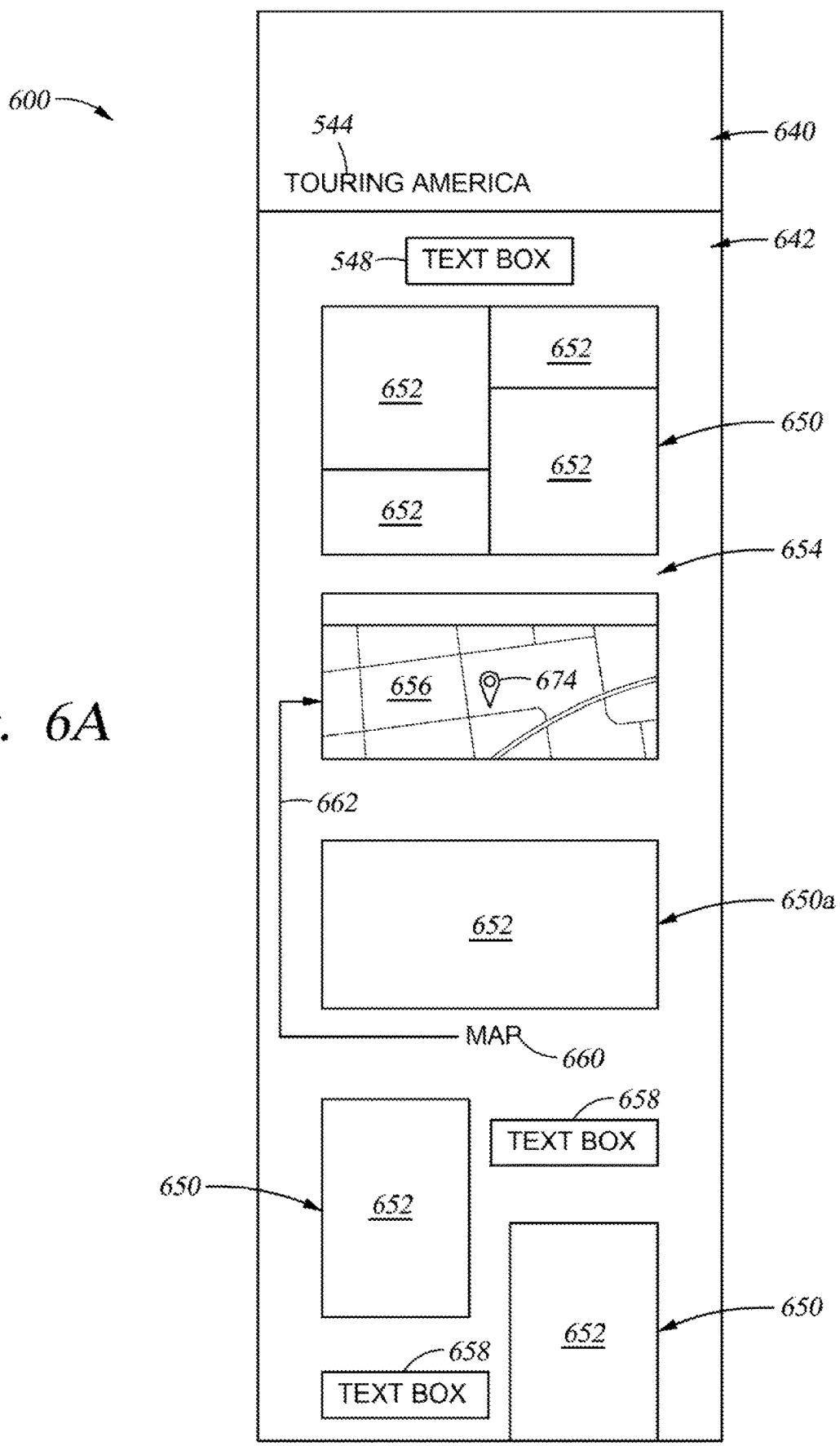
FIGS. 6A-6C illustrate examples of photo narrative essays incorporating geographical maps.

FIG. 6A illustrates another embodiment of a photo narrative essay 600 having a first display feature 640 and a second display feature 642 for displaying media items, such as photos 652. It is to be understood that the photo 652 is just one example of a media item 552. It is contemplated that other media items 552 may be utilized. The photo narrative essay 600 is an example which includes a geographic map 656 and cluster captions 658. The cluster captions 658 may be displayed adjacent to the one or more clusters 650. The cluster captions 658 may be displayed in a divider 654 in certain embodiments. The cluster caption 658 may be one or more captions generally related to the content included in the entire cluster 650 after the cluster 650 is organized, or the cluster caption 658 may be a caption related to a specific photo in the cluster 650. The cluster caption 658 may be applied to the cluster 650 after the cluster 650 has been organized and displayed, either automatically or by the user's input.

As described above, the photo narrative essay 600 further illustrates the geographic map 656. The map 656 indicates and displays the geographic location where the photos 652 in cluster 650a were taken. The photo narrative display application 325 analyzes a geolocation metadata variable associated with the one or more photos 652 included in the cluster 650 and generates the map 656 with one or more markings 674 indicating the geographic location. The photo narrative display application 325 may analyze the geolocation metadata variable of each photo 652 included in the photo narrative essay 600 prior to clustering the photos 652, or the photo narrative display application 325 may analyze the geolocation metadata variables of each photo 650 after input is received from a user to display the map 656. For example, a link 660 labeled "MAP" may be located under a cluster 650, as shown by cluster 650a. By selecting the link 660, the map 656 may be accessed or generated above the cluster 650a, as shown by arrow 662. The map 656 may be displayed below or beside cluster 650a as well. The map 656 may show the geographic location of each photo 652 in the cluster 650a, regardless of the number of photos 652 included in the cluster 650a. In one embodiment, the map 656 may be interactive such that by selecting a marking 674 designating where a photo 652 was taken, the corresponding photo 652 may be highlighted or emphasized. For example, the corresponding photo 652 may be highlighted by the dimming of others photos in the cluster 650 to more easily associate the corresponding photo 652 to the marker 674 indicating the geographic location associated with the photo 652.

Figure 6B:
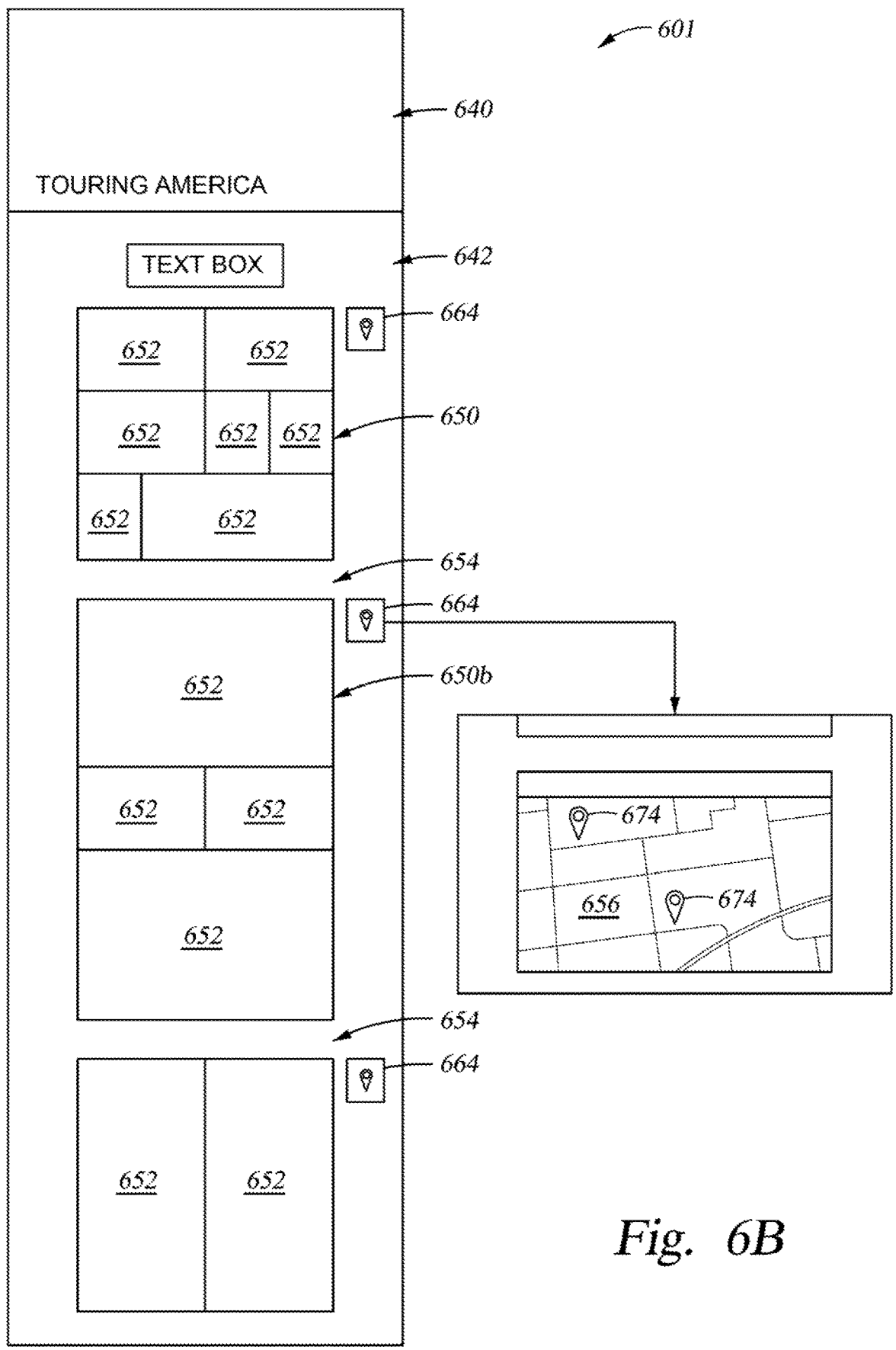

FIG. 6B illustrates another embodiment of a photo narrative essay 601 including the map 656 showing the geographic location of the photos 652 within a cluster 650b. The map 656 is accessed or generated by selecting a map icon 664. The map 656 may then be generated next to the cluster 650b, beside the cluster 650b, or above or below the cluster 650b, based on the analyzed geolocation metadata variable of photos 652 within the cluster 650b. Each cluster 650 in the second display feature 642 may have its own map icon 664 located adjacent to each cluster 650, or a single relocating map icon 664 may be located in the second display feature 642. The single relocating map icon 664 may move adjacent to each cluster 650 as a user scrolls through the second display feature 642 such that the icon 664 is accessible by the user when viewing any portion of the photo narrative essay 601. If multiple photos 652 in the cluster 650b were taken at the same geographical location, the map 656 may show one marking 674 for the group of photos 652 taken at the same location. For example, four photos 652 are shown in cluster 650b, but the corresponding map 656 shows only two markings 674. By selecting each marking 674 on the map 656, the one or more photos 652 taken at that location may be highlighted or emphasized, informing a user as to which photos 652 were taken at which location on the map 656.

Figure 6C:
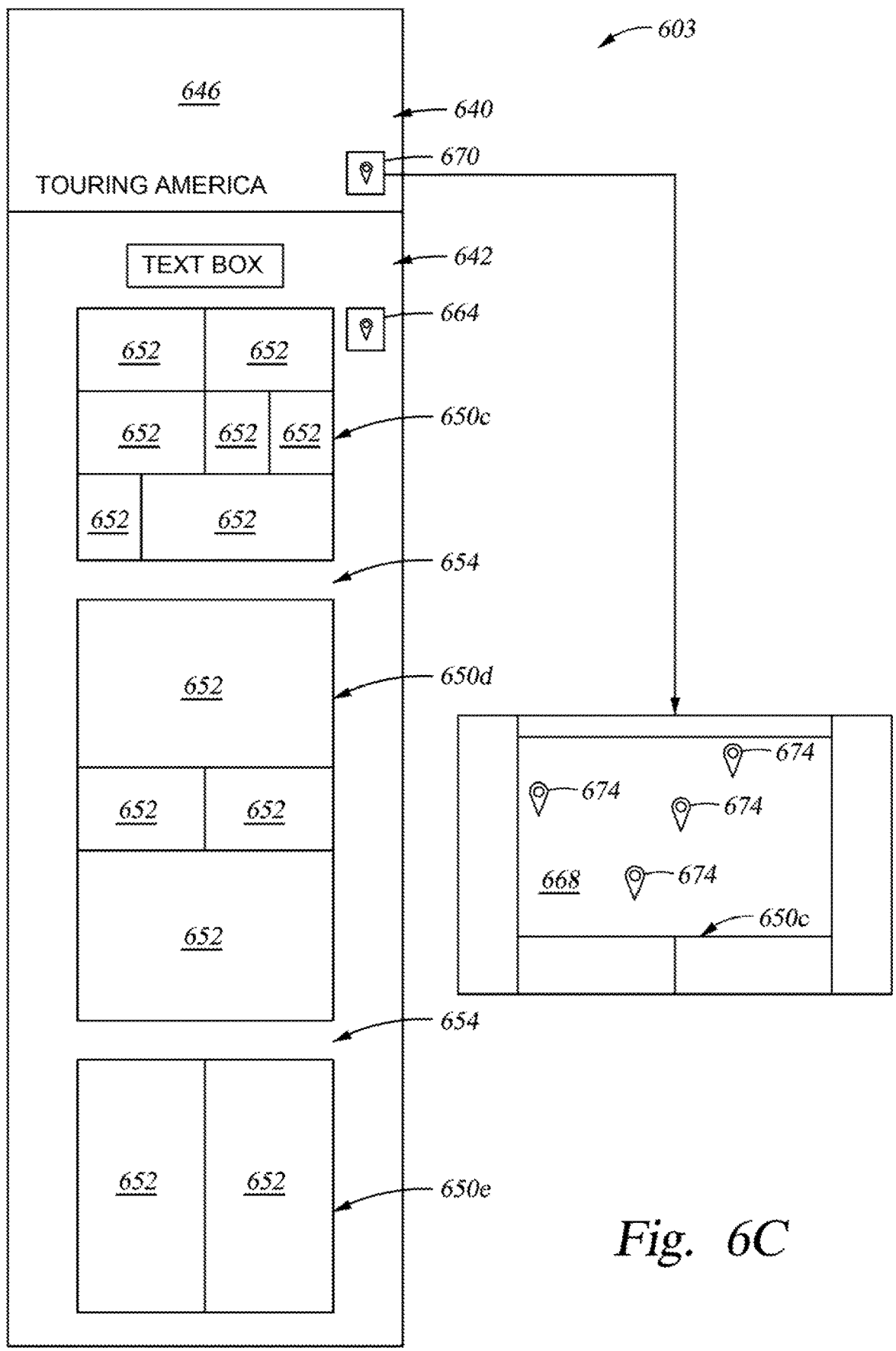

FIGS. 6A and 6B each illustrate one map 656 per cluster 650, where the map 656 shows the geographical location of each photo 652 within the cluster 650. FIG. 6C illustrates a photo narrative essay 603 having a comprehensive map 668 showing a geographic location of each photo 652 in the photo narrative essay 603. A map icon 670 may be located in the first display feature 640. Selecting the map icon 670 may generate a comprehensive map 668 showing the geographic location of each photo 652 taken in both the first and second display features 640, 642 based on the geolocation metadata variable analysis. The comprehensive map 668 may be generated over the feature image 646 of the first display feature 640, or beside or under the first display feature 640. The comprehensive map 668 may display a single marking 674 for multiple photos 652 taken at the same location, or the comprehensive map may display individual markings 674 on the comprehensive map 668 for every photo 652 in the photo narrative essay 603.

For example, a user decides to create a photo narrative essay 603 about a recent trip across the United States of America. During the trip, the user visited and took photos 652 in the following cities: New York City, Philadelphia, St. Louis, Denver, Las Vegas, and Los Angeles. Referring to FIG. 6C, each cluster 650c, 650d, 650e may contain photos 652 from a city the user visited; cluster 650c contains photos 652 taken in New York City, cluster 650d contains photos 652 taken in Philadelphia, and cluster 650e contains photos 652 taken in St. Louis. Other clusters not shown may contain the photos taken in Denver, Las Vegas, and Los Angeles, respectively, and may be accessed by scrolling down in the second features 642. A divider 654 may be located between each cluster 650c, 650d, 650e as a natural break in the narrative, making the clusters visually distinct from one another. The photo narrative display application 325 may determine where each divider 654 is displayed in response to the analysis of the metadata variables. In this example, the dividers 654 separate the different cities the user travelled to based upon the geographic location metadata variable associated with the photos. Thus, a viewer of the photo narrative essay 500 would be able to comprehend and understand the relationship between the clusters 650c, 650d, 650e within the photo narrative essay 603.

After the user uploaded all the photos taken on their trip from each city and selected a number of photos 652 to include in the photo narrative essay 603, the photo narrative display application 325 may automatically populate the clusters 650 based on the analyzed metadata variables. Beyond making a selection of photos 652 to include in the photo narrative essay 603, the user may not need to further organize the selected photos in any way. In one embodiment, the user gives no further input after selecting which photos 652 to include in the photo narrative essay. The photos 652 included in each cluster 650c-650e and the layout of each cluster 650c-650e may be automatically determined by the photo narrative display application 325 in response to the analyzed metadata variables.

Further, the photos 652 in the clusters 650c-650e may be organized in such a way that the photos 652 tell a narrative of the user's trip such that the relationship between the photos 652 in the clusters 650c-650e may be perceptible to a viewer. The photos 652 within the clusters 650c-650e, and the clusters 650c-650e themselves, may be presented and organized sequentially, whether or not the photos 652 or clusters 650c-650e are captioned, by varying the scale, or by varying the malleability such that the arrangement of the media items is flexible to ensure the most aesthetically pleasing arrangement is displayed. The photo narrative display application 325 may determine through analysis of the metadata variables of the photos 652 to separate each city into a new cluster 650c-650e. The photo narrative display application 325 may further determine the organization and display of the photos 652 within each cluster 650c-650e, based on a predetermined priority allocation between the metadata variables. In this example, the photo narrative display application 325 analyzed the metadata variables and organized each city into its own cluster 650c-650e, further organizing the clusters 650c-650e from the east coast to the west coast of the United States.

In this particular example, the photo narrative display application 325 organized the clusters 650c-650e by cities the user visited. If the user were to select the comprehensive map icon 670, a comprehensive map 668 would be generated based on the geolocation metadata variable of the photos 652 in the second display feature 642. The comprehensive map 668 may show the entire United States of America, with markings 674 at New York City, Philadelphia, St. Louis, Denver, Las Vegas, and Los Angeles, showing where the photos 652 in each of the clusters 650 were taken. A user may be able to zoom in or zoom out of the comprehensive map 668. If the user were to select the relocating map icon 664 located in the second display feature 642, a generated comprehensive map 656 may show were all the photos 652 in a particular cluster 650c-650e were taken, such as the photos 652 in cluster 650c. The map 656 may show only a map of New York City, showing markings 674 only at the location the photos 652 in cluster 650c were taken. The relocating map icon 664 may move to be adjacent to the cluster 650d, and the following clusters, as the user scrolls through the second display feature 642. By selecting the relocating map icon 664 adjacent to the cluster 650d, a map of Philadelphia would be generated, showing the location the photos 652 of cluster 650d were taken in Philadelphia.

Figure 7:
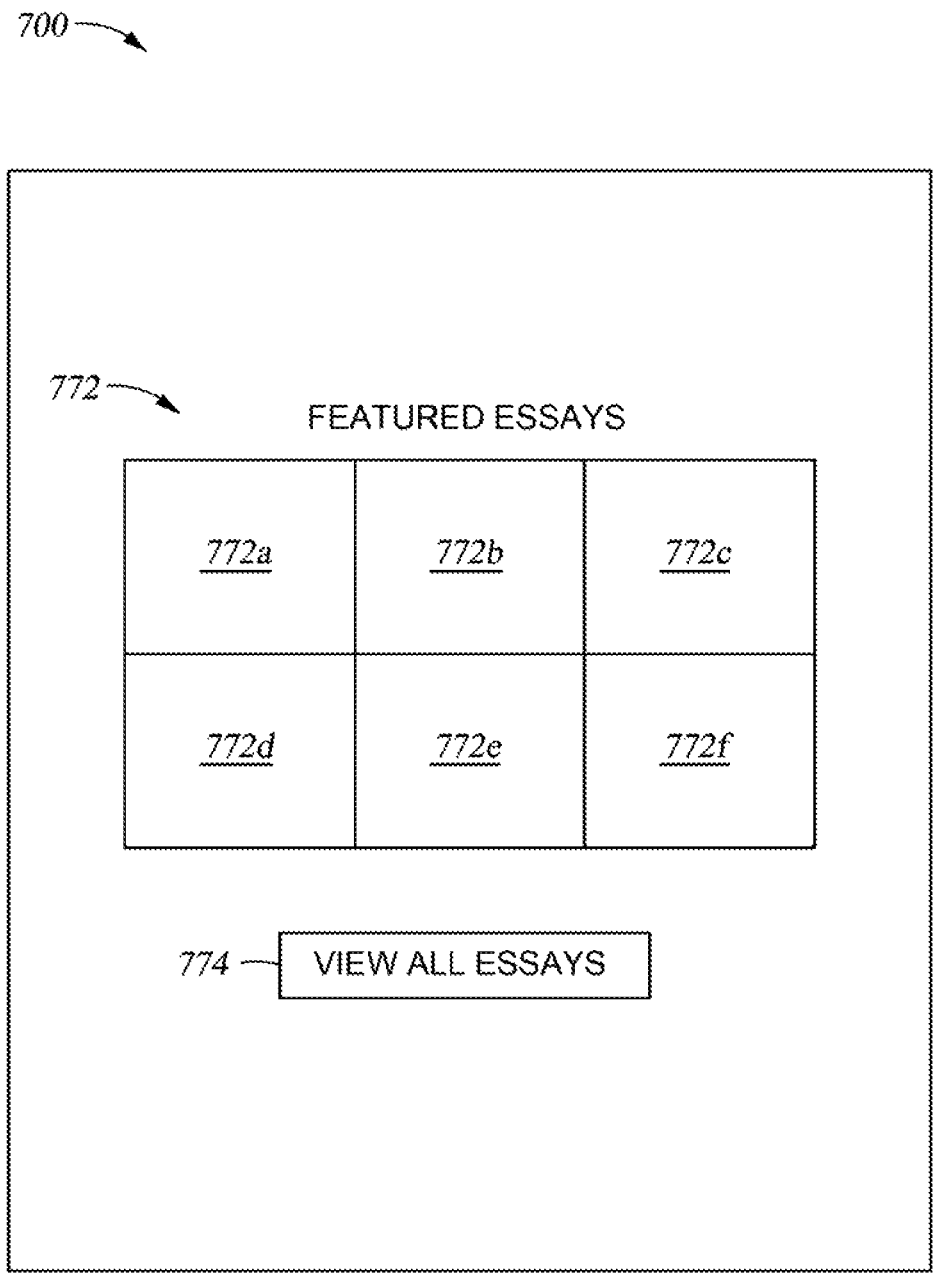
FIG. 7 illustrates an index of photo narrative essays.

In another embodiment, the user may create individual photo narrative essays for each city the user visited on their trip across the United States. FIG. 7 illustrates an index 700 displaying numerous photo narrative essays 772 created by a user. For example, photo narrative essay 772a may be the selected photos the user took in New York City, photo narrative essay 772b may be the selected photos the user took in Philadelphia, photo narrative essay 772c may be the selected photos the user took in St. Louis, photo narrative essay 772d may be the selected photos the user took in Denver, photo narrative essay 772e may be the selected photos the user took in Las Vegas, and photo narrative essay 772f may be the selected photos the user took in Los Angeles. The index 700 may display only a few of the user's photo narrative essays 772. The user may have more photo narrative essays 772 not displayed in the index 700 which may be accessed by selecting a link 774 labeled "VIEW ALL ESSAYS". The feature image of each photo narrative essay 772 may be displayed in the index 700, or a photo selected to be representative of the subject matter of the photo narrative essay 772 may be displayed in the index 700.

If photo narrative essay 772a contains only the photos a user took in New York City, each cluster within the photo narrative essay 772a may be organized by a time constraint, such as three hours, or a distance constraint, such as a one mile radius, which would be determined by the analysis of the metadata variables associated with the photos. Within each cluster, the photos may be organized and displayed in response to a predetermined priority allocation between the metadata variables. For example, if the user took a photo of Time Square and captioned the photo "My favorite place in NYC", that particular photo may be the largest photo within a cluster because the caption associated with the Times Square photo may indicate to the photo narrative essay application 325 an increased priority. In this example, the photo may also be used as the feature image of the photo narrative essay 772a. The caption may be located adjacent to the cluster containing the photo of Time Square. If the caption is located adjacent to the cluster, the caption may be displayed in a corresponding color that correlates to the main colors of the photo. Additionally, if a user desires to include more or less photos from their time in New York City, the user may need to only select or deselect photos in the photo narrative display application. As a result, the photo narrative display application may automatically reanalyze the metadata variables of the selected photos, redesigning the photo narrative essay 772 in response to the additional input from the user.

In sum, the photo narrative essay application allows a user to quickly and efficiently organize and display media items with minimal effort, input, and time. The photo narrative essay application organizes and displays the media items in a logical, nonrandom, narrative, and aesthetically pleasing manner, regardless of the device the photo narrative essay is being displayed on.

While the foregoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure. Therefore, the scope of the present disclosure is determined by the claims that follow.

The invention claimed is:

1. A method of organizing and displaying media items, comprising:
    receiving one or more media items;
    receiving a first input regarding a first display feature;
    analyzing metadata variables of the one or more media items in response to the first input;
    organizing the one or more media items into one or more clusters having a first arrangement in the first display feature in response to the analyzed metadata variables and the first input, wherein the one or more clusters are visually distinct from one another in the first display feature and the one or more media items within each cluster are further organized in response to a predetermined priority allocation between the metadata variables;
    determining first display parameters of a first graphical user interface device;
    displaying the one or more clusters in the first arrangement on the first graphical user interface device based on the first display parameters;
    detecting a change in the first display parameters to second display parameters of a second graphical user interface device, the second graphical user interface device different from the first graphical user interface device;
    adapting the displayed one or more clusters based on the change to the second display parameters, wherein the adapting comprises changing at least one of an order, orientation, configuration, and rotation of the media items without user input to display the one or more clusters in a second arrangement different from the first arrangement; and
    displaying the one or more clusters in the second arrangement on the second graphical user interface device based on the second display parameters.

2. The method of claim 1, wherein analyzing the metadata variables is performed automatically upon receipt of the one or more media items and the first input.

3. The method of claim 1, wherein the metadata variables analyzed are a date variable, a time variable, a location variable, a format variable, and a caption variable.

4. The method of claim 1, wherein each of the one or more clusters generate a map corresponding to a geographical location of the one or more media items comprising each cluster.

5. The method of claim 1, further comprising:
    receiving a second input regarding a second display feature, wherein the second display feature comprises a title and a feature image selected from the one or more media items displayed in the first display feature.

6. The method of claim 1, wherein each of the one or more clusters comprise less than about 15 media items.

7. The method of claim 5, wherein the one or more clusters have corresponding captions displayed adjacent to the one or more clusters in the second display feature.

8. A non-transitory computer-readable storage medium, storing instructions that when executed by a processor, cause the processor to organize and display media items, by performing the steps of:
    receiving one or more media items;
    receiving a first input regarding a first display feature;
    analyzing metadata variables of the one or more media items in response to the first input;
    organizing the one or more media items into one or more clusters having a first arrangement in the first display feature in response to the analyzed metadata variables and the first input, wherein the one or more clusters are visually distinct from one another in the first display feature and the one or more media items within each cluster are further organized in response to a predetermined priority allocation between the metadata variables;
    determining first display parameters of a first graphical user interface device;
    displaying the one or more clusters in the first arrangement on the first graphical user interface device based on the first display parameters;
    detecting a change in the first display parameters to second display parameters of a second graphical user interface device, the second graphical user interface device different from the first graphical user interface device;
    adapting the displayed one or more clusters based on the change to the second display parameters, wherein the adapting comprises changing at least one of an order, orientation, configuration, and rotation of the media items without user input to display the one or more clusters in a second arrangement different from the first arrangement; and
    displaying the one or more clusters in the second arrangement on the second graphical user interface device based on the second display parameters.

9. The non-transitory computer-readable storage medium of claim 8, wherein analyzing the metadata variables is performed automatically upon receipt of the one or more media items and the first input.

10. The non-transitory computer-readable storage medium of claim 8, wherein the metadata variables analyzed are a date variable, a time variable, a location variable, a format variable, and a caption variable.

11. The non-transitory computer-readable storage medium of claim 8, wherein each of the one or more clusters generate a map corresponding to a geographical location of the one or more media items comprising each cluster.

12. The non-transitory computer-readable storage medium of claim 8, further comprising:
receiving a second input regarding a second display feature, wherein the second display feature comprises a title and a feature image selected from the one or more media items displayed in the first display feature.

13. The non-transitory computer-readable storage medium of claim 8, wherein each of the one or more clusters comprise less than about 15 media items.

14. The non-transitory computer-readable storage medium of claim 12, wherein the one or more clusters have corresponding captions displayed adjacent to the one or more clusters in the second display feature.

15. A computer system for organizing and displaying media items, comprising:
a processor; and
a memory storing instructions that, when executed by the processor, cause the computer system to:
receive one or more media items;
receive a first input regarding a first display feature;
analyze metadata variables of the one or more media items in response to the first input;
organize the one or more media items into one or more clusters having a first arrangement in the first display feature in response to the analyzed metadata variables and the first input, wherein the one or more clusters are visually distinct from one another in the first display feature and the one or more media items within each cluster are further organized in response to a predetermined priority allocation between the metadata variables;
determine first display parameters of a first graphical user interface device;
display the one or more clusters in the first arrangement on the first graphical user interface device based on the first display parameters; and
detect a change in the first display parameters to second display parameters of a second graphical user interface device, the second graphical user interface device different from the first graphical user interface device;
adapt the displayed one or more clusters based on the change to the second display parameters, wherein adapting the displayed one or more clusters comprises changing at least one of an order, orientation, configuration, and rotation of the media items without user input to display the one or more clusters in a second arrangement different from the first arrangement; and
display the one or more clusters in the second arrangement on the second graphical user interface device based on the second display parameters.

16. The computer system of claim 15, wherein analyzing the metadata variables is performed automatically upon receipt of the one or more media items and the first input.

17. The computer system of claim 15, wherein the metadata variables analyzed are a date variable, a time variable, a location variable, a format variable, and a caption variable.

18. The computer system of claim 15, wherein each of the one or more clusters generate a map corresponding to a geographical location of the one or more media items comprising each cluster.

19. The computer system of claim 15, the memory further comprising instructions that, when executed by the processor, cause the computer system to:
receive a second input regarding a second display feature, wherein the second display feature comprises a title and a feature image selected from the one or more media items displayed in the first display feature.

20. The computer system of claim 15, wherein each of the one or more clusters comprise less than about 15 media items.

21. The computer system of claim 19, wherein the one or more clusters have corresponding captions displayed adjacent to the one or more clusters in the second display feature.

* * * * *